(12) United States Patent
McKellar et al.

(10) Patent No.: US 7,703,015 B2
(45) Date of Patent: Apr. 20, 2010

(54) DELTA-HANDLING IN SERVER-PAGES

(75) Inventors: Brian McKellar, Heidelberg (DE);
Bjorn Goerke, Muhlhausen (DE);
Martin Moser, Sandhausen (DE)

(73) Assignee: SAP Aktiengesellschaft, Walldorf (DE)

( * ) Notice: Subject to any disclaimer, the term of this patent is extended or adjusted under 35 U.S.C. 154(b) by 1092 days.

(21) Appl. No.: 10/137,727

(22) Filed: Apr. 30, 2002

(65) Prior Publication Data

US 2003/0217331 A1    Nov. 20, 2003

(51) Int. Cl.
*G06F 17/00* (2006.01)
*G06F 15/16* (2006.01)

(52) U.S. Cl. ................. 715/513; 715/229; 709/201
(58) Field of Classification Search ............ 715/513, 715/511, 711; 709/201; 707/10
See application file for complete search history.

(56) References Cited

U.S. PATENT DOCUMENTS

| | | | | |
|---|---|---|---|---|
| 5,701,451 A | * | 12/1997 | Rogers et al. ................. 707/1 |
| 5,706,507 A | * | 1/1998 | Schloss ................. 707/104.1 |
| 5,835,712 A | * | 11/1998 | DuFresne ................. 709/203 |
| 5,946,697 A | | 8/1999 | Shen |
| 5,963,952 A | * | 10/1999 | Smith ................. 707/102 |
| 5,983,227 A | | 11/1999 | Nazem et al. |
| 6,003,087 A | * | 12/1999 | Housel et al. ............ 709/229 |
| 6,006,260 A | | 12/1999 | Barrick et al. |
| 6,031,989 A | * | 2/2000 | Cordell ................. 717/109 |
| 6,073,173 A | * | 6/2000 | Bittinger et al. ............ 709/224 |
| 6,112,242 A | * | 8/2000 | Jois et al. ................. 709/225 |
| 6,122,657 A | * | 9/2000 | Hoffman et al. ............ 709/201 |
| 6,128,655 A | * | 10/2000 | Fields et al. ................. 709/219 |
| 6,161,107 A | * | 12/2000 | Stern ................. 707/104.1 |
| 6,167,395 A | * | 12/2000 | Beck et al. ................. 707/3 |
| 6,209,029 B1 | * | 3/2001 | Epstein et al. ............ 709/219 |
| 6,239,797 B1 | | 5/2001 | Hills et al. ................. 345/340 |
| 6,249,291 B1 | * | 6/2001 | Popp et al. ................. 345/473 |
| 6,253,228 B1 | * | 6/2001 | Ferris et al. ................. 709/203 |
| 6,266,681 B1 | * | 7/2001 | Guthrie ................. 715/501.1 |
| 6,311,187 B1 | | 10/2001 | Jeyaraman |
| 6,377,957 B1 | | 4/2002 | Jeyaraman |

(Continued)

FOREIGN PATENT DOCUMENTS

EP    1016987 A2    5/2000

OTHER PUBLICATIONS

Seshadri, Govind, "Advanced Form Processing Using JSP", JavaWorld, Mar. 2000, pp. 1-20, (downloaded from: http://www.javaworld.com/javaworld/jw-03-2000/jw-0331-ssj-forms_p.html).*

(Continued)

*Primary Examiner*—Robert Stevens
(74) *Attorney, Agent, or Firm*—Fish & Richardson P.C.

(57) ABSTRACT

Method, system and computer program product for delta-handling. A server stores a page-document that comprises at least one component. The page-document is translated into a browser-document that is displayed by a client. The server receives a request from the client resulting in an update of a specific component of the page-document with an application-delta. The specific component has a writer-function. The server generates a browser-delta by applying the writer-function to the application-delta. The server sends the browser-delta to the client for updating the browser-document on the client.

15 Claims, 5 Drawing Sheets

Server memory

U.S. PATENT DOCUMENTS

| | | | |
|---|---|---|---|
| 6,389,592 B1* | 5/2002 | Ayres et al. | 717/172 |
| 6,397,387 B1 | 5/2002 | Rosin et al. | |
| 6,429,880 B2* | 8/2002 | Marcos et al. | 715/744 |
| 6,480,865 B1 | 11/2002 | Lee et al. | |
| 6,605,120 B1 | 8/2003 | Fields et al. | |
| 6,622,168 B1* | 9/2003 | Datta | 709/219 |
| 6,694,336 B1* | 2/2004 | Multer et al. | 707/201 |
| 6,766,351 B1* | 7/2004 | Datla | 709/203 |
| 6,807,606 B2* | 10/2004 | Copeland et al. | 711/120 |
| 7,007,237 B1* | 2/2006 | Sharpe | 715/764 |
| 7,051,084 B1 | 5/2006 | Hayton et al. | |
| 7,139,976 B2* | 11/2006 | Kausik et al. | 715/522 |
| 2002/0004813 A1* | 1/2002 | Agrawal et al. | 709/201 |
| 2002/0046240 A1* | 4/2002 | Graham et al. | 709/203 |
| 2002/0091736 A1 | 7/2002 | Wall | |
| 2002/0107892 A1 | 8/2002 | Chittu et al. | |
| 2002/0147849 A1* | 10/2002 | Wong et al. | 709/246 |
| 2002/0156812 A1* | 10/2002 | Krasnoiarov et al. | 707/513 |
| 2002/0156815 A1* | 10/2002 | Davia | 707/517 |
| 2002/0188696 A1* | 12/2002 | Ullmann et al. | 709/219 |
| 2003/0018612 A1 | 1/2003 | Melbin | |
| 2003/0125966 A1* | 7/2003 | Viswanath et al. | 705/1 |
| 2003/0149749 A1* | 8/2003 | Carlucci et al. | 709/219 |
| 2003/0188016 A1* | 10/2003 | Agarwalla et al. | 709/241 |
| 2003/0212987 A1* | 11/2003 | Demuth et al. | 717/130 |
| 2003/0225826 A1 | 12/2003 | McKellar et al. | |
| 2003/0226106 A1 | 12/2003 | McKellar et al. | |
| 2004/0205558 A1* | 10/2004 | Holloway et al. | 715/513 |
| 2005/0099963 A1 | 5/2005 | Multer et al. | |

OTHER PUBLICATIONS

Mahmoud, Qusay H., "Web Application Development with JSP and XML, Part 1: Fast Track JSP", TheServerSide.COM, May 2001, pp. 1-10, (downloaded from: http://www.theserverside.com/articles/article.tss?I=JSP-XML).*

Mahmoud, Qusay H., "Web Application Development with JSP and XML, Part III: Developing Custom JSP Tags", TheServerSide.COM, Aug. 2001, pp. 1-22, (downloaded from: http://www.theserverside.com/articles/article.tss?I=JSP-XML3).*

McPherson, Scott, "Java Server Pages: A Developer's Perspective", developers.sun.com, Aug. 2001, pp. 1-5, (downloaded from: http://www.sun.com/developer/technicalArticles/Programming/jsp/index.html).*

Kristmundsson, Thor, et al., "Strut Your Stuff With JSP Tags: Use and Extend the Open Source Struts JSP Tag Library", developers.sun.com, Aug. 2001, pp. 1-7, (downloaded from: http://www.sun.com/developer/technicalArticles/javaserverpages/struts_jsp/).*

Weissinger, A. Keyton, ASP in a Nutshell, 2nd Edition, O'Reilly & Associates, Sebastopol, CA, Jul. 2000, pp. 3-22.*

Hall, Marty, et al., Core Web Programming, 2nd Edition, Sun Microsystems Press (Prentice Hall), Palo Alto, CA, © 2001, pp. 792-793, 965-968, 971-977 and 1015-1026.*

Hougland, Damon, et al., Core JSP, Prentice Hall PTR, Upper Saddle River, NJ, © 2001, pp. 1-11, 54-56, 60-61, 78-87 and 131-143.*

Microsoft Dictionary, 5th Edition, Microsoft Press, Redmond WA, (c) 2002, pp. 293-294.*

Wills, Craig E., et al., "N for the Price of 1: Bundling Web Objects for More Efficient Content Delivery", WWW 10, May 1-5, 2001, Hong Kong, pp. 257-264.*

Housel, Barron C., et al., "WEBExpress: A Client/Intercept Based System for Optimizing Web Browsing in a Wireless Environment", Mobile Networks and Applications, vol. 3, Baltzer Science Publishers BV, © 1998, pp. 419-431.*

Feinstein, Wei Pan, et al., "A Study Of Technologies For Client/Server Applications", Proceedings of the 38th Annual ACM Southeast Regional Conference, Apr. 2000, Hong Kong, pp. 184-193.*

Housel, Baron C., et al., "WebExpress: A Client/Intercept Based System for Optimizing Web Browsing in a Wireless Environment", Mobile Networks and Application, vol. 3, Issue 4, Baltzer Science Publishers BV, © 1998, pp. 419-431.*

Kemper, Alfons, et al., "Hyperqueries: Dynamic Distributed Query Processing on the Internet", Proceedings of the 27th VLDB Conference, Roma, Italy, Sep. 11-14, 2001, pp. 1-10.*

Bai, Jing, et al., "Design and Development of a Interactive Medical Teleconsultation System Over the World Wide Web", IEEE Transactions on Information Technology in Biomedicine, vol. 2, No. 2, Jun. 1998, pp. 74-79.*

Dickens, Phillip M., et al., "An Evaluation of Java's I/O Capabilities for High-Performance Computing", Proceedings of the ACM 2000 Conference on Java Grande, San Francisco, CA, © 2000, pp. 26-35.*

Mogul, Jeffrey C., "Squeezing More Bits Out of HTTP Caches", IEEE Network, vol. 14, Issue 3, May/Jun. 2000,.pp. 6-14.*

Mogul, Jeffrey C., et al., "Potential Benefits of Delta Encoding and Data Compression for HTTP", SIGCOMM '97, Cannes, France, Sep. 14-18, 1997, pp. 181-194.*

Edwards, Peter; "DIY Intranets With CFML/XML/HTML/CGI/ASP/JSP"; *Vine*; No. 119; 2000; pp. 53-60.

Chang, George et al.; "A Graphical Environment For Change Detection In Structured Documents"; *IEEE Computer Soc.*; Aug. 13, 1997; pp. 536-541.

Floyd, Rick et al.; "Mobile Web Access Using eNetwork Web Express"; *IEEE Personal Communications*; vol. 5, No. 5; Oct. 1, 1998; pp. 47-52.

Williams, S., "HTTP: Delta-Encoding Notes"; *Internet*; Jan. 17, 1997; 7pp.

Douglis, Fred et al.; "HPP: HTML Macro-Preprocessing to Support Dynamic Document Caching"; *Proceedings of The Usenix Symposium On Internet Technologies and Systems*; Dec. 8, 1997; pp. 83-94.

Williams, "HTTP: Delta-Encoding Notes"; Published Jan. 17, 1997; Computer Science Department, Virginia Polytechnic and State University Blacksburg, 10 pages URL: http://ei.cs.vt.eclu/~williams/DIFF/prelim.html.

Housel, C., et al.; "WebExpress: A System for Optimizing Web Browsing in a Wireless Environment"; *Proceedings of the Annual International Conference on Mobile Computing and Networking*; Nov. 11, 1996; pp. 108-16.

* cited by examiner

DELTA-HANDLING IN SERVER-PAGES

BACKGROUND OF THE INVENTION

The present invention generally relates to electronic data processing, and more particularly, relates to method, computer program product and system for client-server communication.

Server-pages, such as JavaServer Pages™ ("JSP") pages, that include relevant information for a graphical user interface ("GUI") are typically generated on a server. The result is a browser-document that the server transmits to a client. At the client, the browser-document is rendered for display by a conventional browser, such as the Microsoft® Internet Explorer. When the user interacts with the client through the GUI to refresh the page, the whole process is repeated. This requires high bandwidth of the computer network that connects the client to the server because the whole page (layout information and data) is re-generated on the server and the resulting browser-document is re-transmitted from the server to the client through the network. Further, the user is confronted with undesired effects, such as waiting time or screen flicker, until the refreshed page is finally presented.

Some conventional browsers, such as the Microsoft Internet Explorer 6.0, include a feature for flicker-free rendering. When the client receives a modified page, the browser identifies modified components of the page and only replaces these components instead of the whole page (for example, by dynamic HTML injection into the page's document object model). This leads to a reduction of screen-flicker for the user but still requires bandwidth for transmission of the whole page from the server to the client.

SUMMARY OF THE INVENTION

The present invention provides methods, computer program products and computer-implemented systems to reduce bandwidth requirements in client-server communication when refreshing server-pages. Particular implementations provide the following features.

In a server-side implementation, a server stores a page-document that includes at least one component. The page-document is translated into a browser-document that is rendered by a client for display. The server receives a request from the client that results in an update of a specific component of the page-document with an application-delta. The specific component has a writer-function. The server generates a browser-delta by applying the writer-function to the application-delta. The server sends the browser-delta to the client for updating the browser-document on the client.

In a client-side implementation, a client renders for display a browser-document that is derived from a page-document stored on a server. The client receives a browser-delta from the server. A specific page-component of the page-document has a writer-function that generates the browser-delta on the server by applying the writer-function to a corresponding application-delta. The client updates the browser-document with the browser-delta.

With these implementations, the required bandwidth for network communication is lower when compared to systems where the whole browser-document is exchanged between the server and client. Often only a minor portion of the browser-document is modified. In this case the browser-delta transmission requires significant less bandwidth than the whole browser-document transmission.

Also, the browser-delta is determined by a writer-function of the corresponding page-component. Therefore, the page component determines the granularity of the browser-delta. High granularity (e.g., on the level of a single character) can be useful, when dealing with complex page-components, such as nested tables, where only a minor part of the component is subject to modification and the major part of the component represents static information.

Further, update of the browser-document with the browser-delta results in a flicker-free change of the graphical user interface as seen by a user.

Particular aspects of the invention will be realized and attained by means of the elements and combinations particularly pointed out in the appended claims. It is to be understood that both, the foregoing general description and the following detailed description are exemplary and explanatory only and are not restrictive of the invention as described.

BRIEF DESCRIPTION OF THE DRAWINGS

Like reference symbols in the various drawings indicate like elements.

DETAILED DESCRIPTION

Definitions of Terms

Client: A computer having a client relationship with a computer acting as a server.

Server: A computer having a server relationship with a computer acting as client. A client and server are generally remote from each other and typically interact through a communication network, e.g., a local area network (LAN) or a wide area network (WAN).

Application data: Data relating to a computer program application (e.g., customer number, address, phone number, and so forth).

Layout data: Data defining placement of content of a graphical user interface ("GUI").

Page-document: A document including data, such as application data or layout data. For example, a page-document can be a JSP page, a Business Server Page (BSP) page or an Active Server Pages (ASP) page.

Browser-document: A document that can be processed and rendered for display by a conventional browser.

Tag: A representation of a page-component in a page. For example, in JSP pages, tags use XML notation and represent a Java class.

Writer-function: A function of a class that corresponds to a page-component and provides a browser-delta for the page-component as output. The class is written in an object oriented programming language, such as Java, C++, ABAP Objects or any other object oriented programming language.

Output-stream: Data structure to collect the output of writer-functions.

Document object model: The Document Object Model (DOM) is a platform- and language-neutral interface that allows programs and scripts dynamically to access and update the content, structure and style of documents, and provides a mechanism to access and manipulate parsed HTML and XML content.

Figure 1:
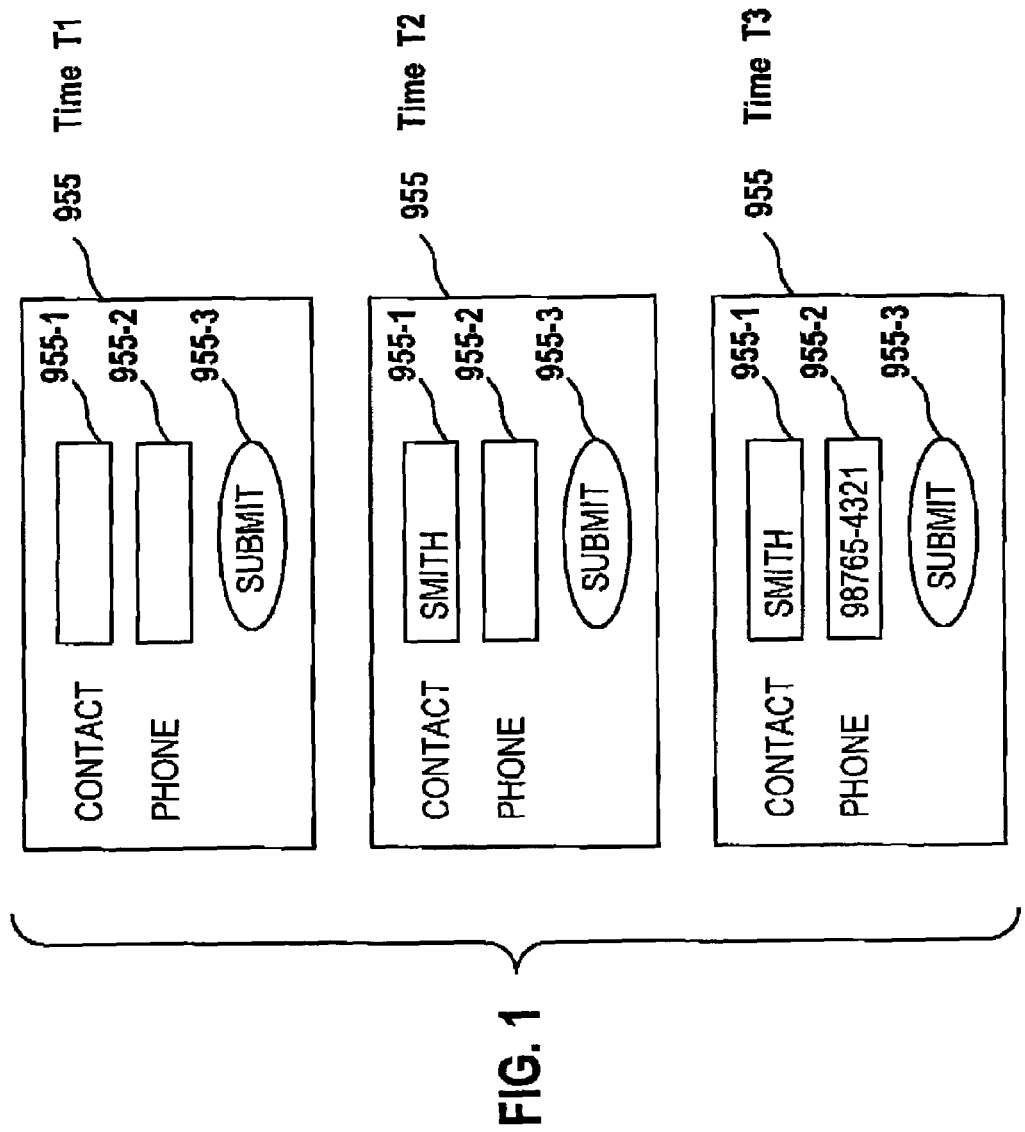
FIG. 1 illustrates an implementation of a graphical user interface according to one embodiment of invention at three consecutive time points.

FIG. 1 illustrates a graphical user interface 955 in one implementation at three consecutive time points T1, T2 and T3.

For convenience of explanation, the following example of a user's interaction with graphical user interface 955 is used throughout this specification. However, any graphical user interface can be implemented according to the present invention. GUI 955 is presented to the user on an output device and the user interacts with GUI 955 by using an input device.

GUI 955 is a user interface (form) that allows the user to retrieve a phone number 955-2 for a contact person 955-1 from a corresponding application database. The user is prompted with form-components 955-1, 955-2, 955-3. Contact component 955-1 is an input field where the user can enter the name of the contact person. Submit component 955-3 can be implemented as a button that is pressed by the user to send a request for the contact person's phone number to the corresponding application. Phone component 955-2 is an output field where the search result (phone number of the contact person) is presented to the user.

At T1, the user is prompted with form 955, where contact component 955-1 and phone component 955-2 are empty.

The user then enters the name (e.g., SMITH) of the contact person into contact component 955-1 and, at T2, uses submit component 955-3 (e.g., submit-button) to send a request for the contact person's phone number to the corresponding application.

At T3, the application has found the contact person's phone number (e.g., 98765-4321) and the result is rendered for display for the user in phone component 955-2.

Figure 2:
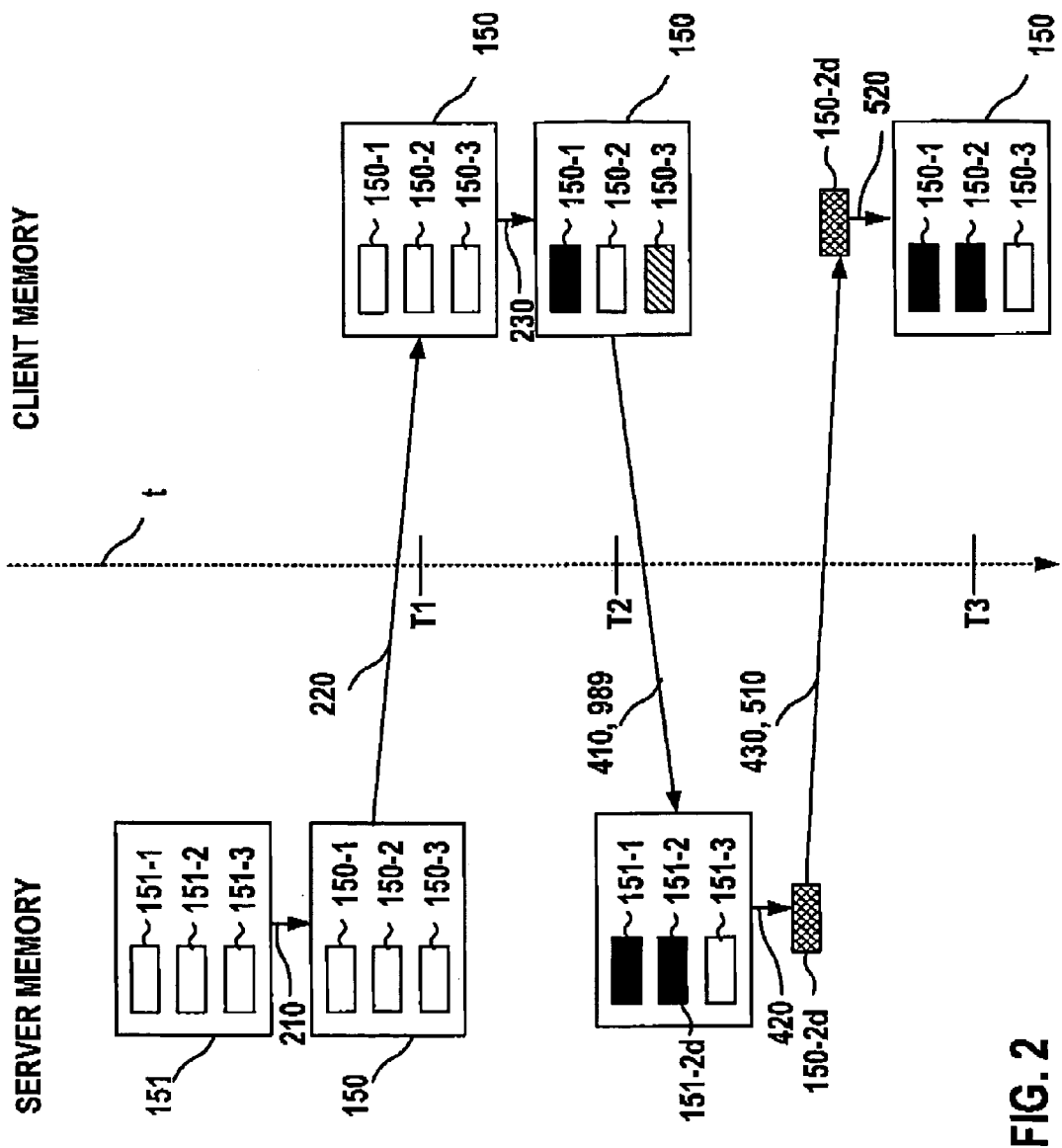
FIG. 2 illustrates interaction of a server and a client that are operated according to one embodiment of the invention.

FIG. 2 illustrates interaction of a server and a client when operated according to one embodiment of the present invention.

Time scale t (dashed arrow) indicates the chronological order of events; however, it is not drawn to any scale. Time points T1, T2, T3 (shown also in FIG. 1) are shown as reference time points in the flow of events. Solid arrows represent specific events or signals.

The left side of time scale t shows objects that are stored in a memory of the server ("server memory"). In the example, the server computer accesses application data, such as contact person or phone number.

The right side of time scale t shows objects that are stored in a memory of the client ("client memory"). In the example, the client computer presents application data to the user in a GUI 955 (FIG. 1).

The sever memory stores a page-document 151. The page-document 151 includes information to generate form 955. For example, page-document 151 is a page, e.g., a JSP page. The page-document 151 includes page-components 151-1, 151-2, 151-3 that correspond to form-components 955-1, 955-2, 955-3 (FIG. 1), respectively.

The server translates (210) page-document 151 into browser-document 150. For example, browser-document 150 can be a markup language document, such as an HTML, XML, XHTML or WML document, which can be processed and rendered by a conventional browser. Browser-document 150 includes browser-components 150-1, 150-2, 150-3 that correspond to page-components 151-1, 151-2, 151-3, respectively.

The server then sends the browser-document 150 to the client, where it is stored in the client memory and rendered (220) at time T1 as form 955 for display on an output device.

The user then enters the name (e.g., SMITH) of the contact person into contact component 955-1. The client fills the corresponding browser-component 150-1 with the contact person name accordingly (230) (illustrated by dark fill color). At T2, the client submits request 989 for the contact person's phone number to the server. For example, the user presses submit-component 955-3 and the client memory stores a corresponding status (illustrated by a diagonal grid pattern) for the browser-component 150-3.

The server receives (410) request 989. The server obtains the requested phone number, for example, by accessing an application (e.g., an address database) and retrieving the requested phone number from the application. The server updates the corresponding page-component 151-2 in the page-document 151 with an application-delta 151-2d (illustrated by dark fill color). In this example, the application-delta 151-2d corresponds to phone number "98765-4321". Further application-deltas for other page-components can be generated substantially simultaneously if indicated by request 989.

Figure 3:
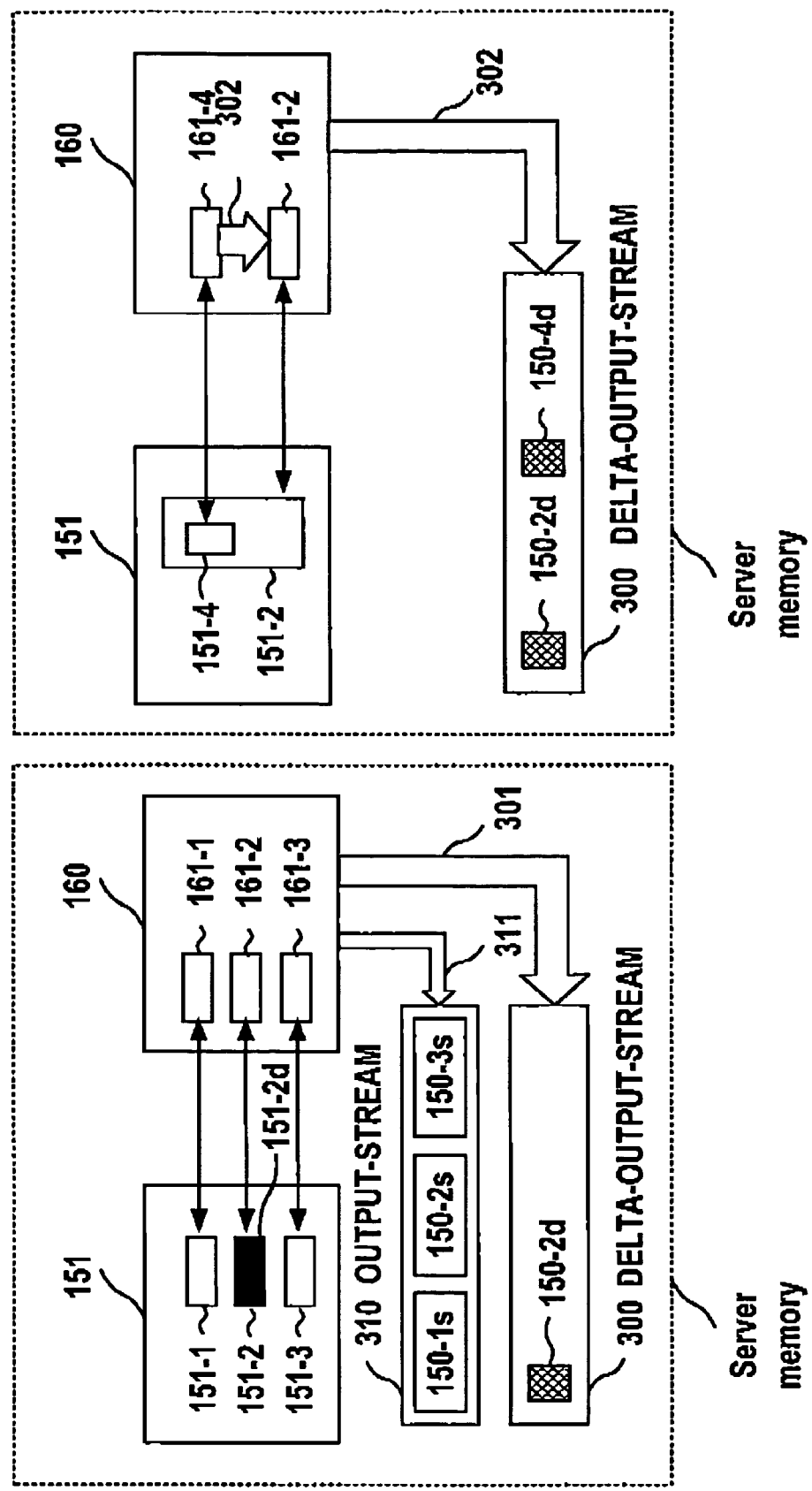
FIGS. 3A and 3B illustrate details of generating a browser-delta on the server.

Then, the server generates (420) browser-delta 150-2d by applying a corresponding writer-function 161-2 (such as the one shown in FIG. 3) to the application-delta 151-2d. Writer-function 161-2 is explained in detail in reference to FIG. 3.

Then, the server sends (430) the browser-delta 150-2d to the client. The browser-delta 150-2d is stored in the client memory after being received (510) by the client. The client uses the browser-delta 150-2d to update (520) the corresponding browser-component 150-2 (illustrated by dark fill color) in the browser-document 150. An implementation example for updating (520) browser-document 150 is explained in detail in reference to FIG. 4. At time T3, the contact person's phone number (e.g., 98765-4321) is displayed for the user in the phone component 955-2 that corresponds to updated browser-component 150-2.

FIGS. 3A, 3B illustrate details of an example for generating (420) browser-deltas on the server. In FIG. 3A, the server memory (dashed frame) stores the page-document 151 and a writer-function-pool 160. In the example, each page-component 151-1, 151-2, 151-3 has a corresponding writer-function 161-1, 161-2, 161-3 of writer-function-pool 160 assigned (illustrated by double arrows) to it. In the following, writer-function 161-2 of page-component 151-2 is explained in detail. Other writer-functions work in a corresponding way for their corresponding page-components.

When the server translates page-document 151 into browser-document 150, the writer-function 161-2 identifies the application-delta 151-2d of page-component 151-2 and generates (420 in FIG. 2) corresponding browser-delta 150-2d. In other words, the writer-function 161-2 is able to identify any change (e.g., application-delta 151-2d illustrated by dark fill color) of page-component 151-2 since the previous translation (210 in FIG. 2) of page-document 151 and to separate the corresponding browser-delta 150-2d from the static browser-component part 150-2s.

Advantageously, writer-function 161-2 knows the structure of page-component 151-2 and also knows where application-deltas are to be expected and which parts of the page-component have a static character. In other words, writer-function 161-2 knows which portions of browser-component 150-2 can include browser-deltas that correspond to the application-deltas of page-component 151-2. Therefore, for browser-delta generation, writer-function 161-2 can scan portions in browser-component 150-2 that correspond to possible application-deltas. This is faster than scanning browser-component 150-2 completely.

Writer-function 161-2 writes 301 browser-delta 150-2d to delta-output-stream 300. Static parts 150-2s of browser-component 150 are written 311 to output-stream 310, which can be the standard output stream for browser-document 150.

Optionally, the server can generate a browser-delta in delta-output-stream 300 for each page-component 151-1, 151-2, 151-3 having a corresponding writer-function 161-1, 161-2, 161-3 that is applied to a corresponding application-delta. In the example, the assumption is that only page-component 151-2 was changed, whereas the other page-components 151-1, 151-3 remain unchanged and, therefore, result in static browser-component parts 150-1s, 150-3s in output-stream 310.

Writer-function 161-2 is now further explained by using a specific JSP implementation of page-document 151. The page-document 151 uses an XML-notation to specify tags in the page. Each page-component corresponds to a tag in the page. The tag is represented by an XML element with attributes. The XML element represents an interface to a class (e.g., a Java class). Writer-function 161-2 is a function of this class.

Table 1 shows a simplified coding section of page 151 for the example of FIG. 1. Line 1 defines Java as the page language. Line 2 defines a namespace "htmlb". Tags within that namespace are implemented in a so called tag library (taglib). Lines 4 and 8 define the start and end, respectively, of the page content definition section. Line 5 defines an empty (blank value) input field for the name of a contact person (corresponding to tag 151-1). Line 6 defines an empty output field for the contact person's phone number (corresponding to tag 151-2) because no phone number is stored in value variable value="<%=phone%>" at that time.

TABLE 1

| line | simplified coding |
|---|---|
| 1 | <%@page language="Java"%> |
| 2 | <%@taglib uri="http:/..."prefix="htmlb"%> |
| 3 | ... |
| 4 | <htmlb:page> |
| 5 | <htmlb:inputField id="contact" value="<%=contact%>" /> |
| 6 | <htmlb:inputField id="phone" value="<%=phone%>" /> |
| 7 | <htmlb:button id="submitButton" text="Submit" onClick="HandleSubmit" /> |
| 8 | </htmlb:page> |
| 9 | .... |

Line 7 defines a submit button (corresponding to tag 151-3) that the user can use to launch a request for a phone number.

When page 151 is rendered (210) for the first time, the server generates from tag 151-2 (Table 1, line 6) the corresponding Java class that is compiled and then executed to generate browser-component 150-2 as, for example, corresponding HTML statements. For convenience of explanation, other page-components (tags) of page-document 151 are not considered in this example but can be implemented by those skilled in the art according to the example that is given below. An HTML example of browser-component 150-2 in browser-document 150 is shown in table 2. The HTML statements are written 311 into output-stream 310.

TABLE 2

| 1 | ... |
|---|---|
| 2 | <input id=phone" name="phone" type="text" value="" /> |
| 3 | ... |

Before page 151 is rendered a second time, the value variable (value="<%=phone%>", table 1 line 6) of tag 151-2 is changed because the phone number 98765-4321 was identified and is now stored in the corresponding value variable. For convenience of explanation, changes in tag 151-1 are not discussed further.

In the example, writer-function 161-2 is a function of the Java class that corresponds to page-component 151-2. Advantageously, writer-function 161-2 knows that the value attribute (application-delta 151-2d) of the tag "inputField" is subject to modification and, therefore, generates (420) browser-delta 150-2d from the changed "inputField" tag. In one embodiment of writer-function 161-2, the following HTML (Table 3) statement 150-2d is generated (420).

TABLE 3

<input id="phone" name="phone" type="text" value="98765-4321" />

Preferably, writer-function 161-2 writes (301) HTML statement 150-2d to delta-output-stream 300. Static browser-component parts (e.g., 150-1s, 150-2s, 150-3s) are written (311) into output-stream 310. In other words, each tag can separate its browser-deltas from its unmodified parts and a delta-handler selects an appropriate output-stream. An example for the delta-handler is a Java class that is represented by a corresponding tag (e.g., <namespace:deltaHandler>, where the namespace can refer to any tag library). For example, the delta-handler can be implemented using function-pool 160. Preferably, the start/end tags of the delta-handler are inserted in lines 3/9 of table 1, respectively.

In one implementation, the server stores two versions of page-document 151 in the server memory. A first version (Table 1) corresponds to the page-document that is sent to the client before the user interacts with the client. The second version (modified line 6 of Table 1) includes all application-deltas that result from the user's interaction with the client. The delta-handler then compares the first version with the second version. In case that the delta-handler identifies additional application-deltas in the second version, the corresponding browser-deltas are written to the delta-output-stream 300.

It is an effect of the present invention that application-deltas can be defined for each tag with any granularity. For example, browser-delta 150-2d that is generated through writer-function 161-2 from the example of Table 1 can even be at the level of tag attributes, such as the value attribute. In this case, in an alternative implementation of writer-function 161-2, browser-delta 150-2d can be a Java Script statement, as illustrated in table 4:

TABLE 4

<SCRIPT language="JavaScript">
    document.all.item("phone").value = "98765-4321";
</SCRIPT>

The Java Script statement is used at the client to replace the corresponding value of the phone number in the document object model of browser-document 150 that is stored in the client memory.

High granularity with respect to application-deltas results in small data packages for the corresponding browser-deltas, which considerably reduces the amount of data that needs to be exchanged between the server and the client.

FIG. 3B shows an example of a page implementation that uses nested tags. A parent-tag 151-2 (e.g., a table) can have child-tags 151-4 (e.g., cells). A writer-function 161-4 of child-tag 1514 can write (302) a corresponding browser-delta 150-4d to the writer-function 161-2 of parent-tag 151-2 instead of writing it directly to delta-output-stream 300 or output-stream 310. The parent-tag 151-2 collectively writes all browser-deltas (e.g., 1504d) of its child-tags to delta-output-stream 300.

Figure 4:
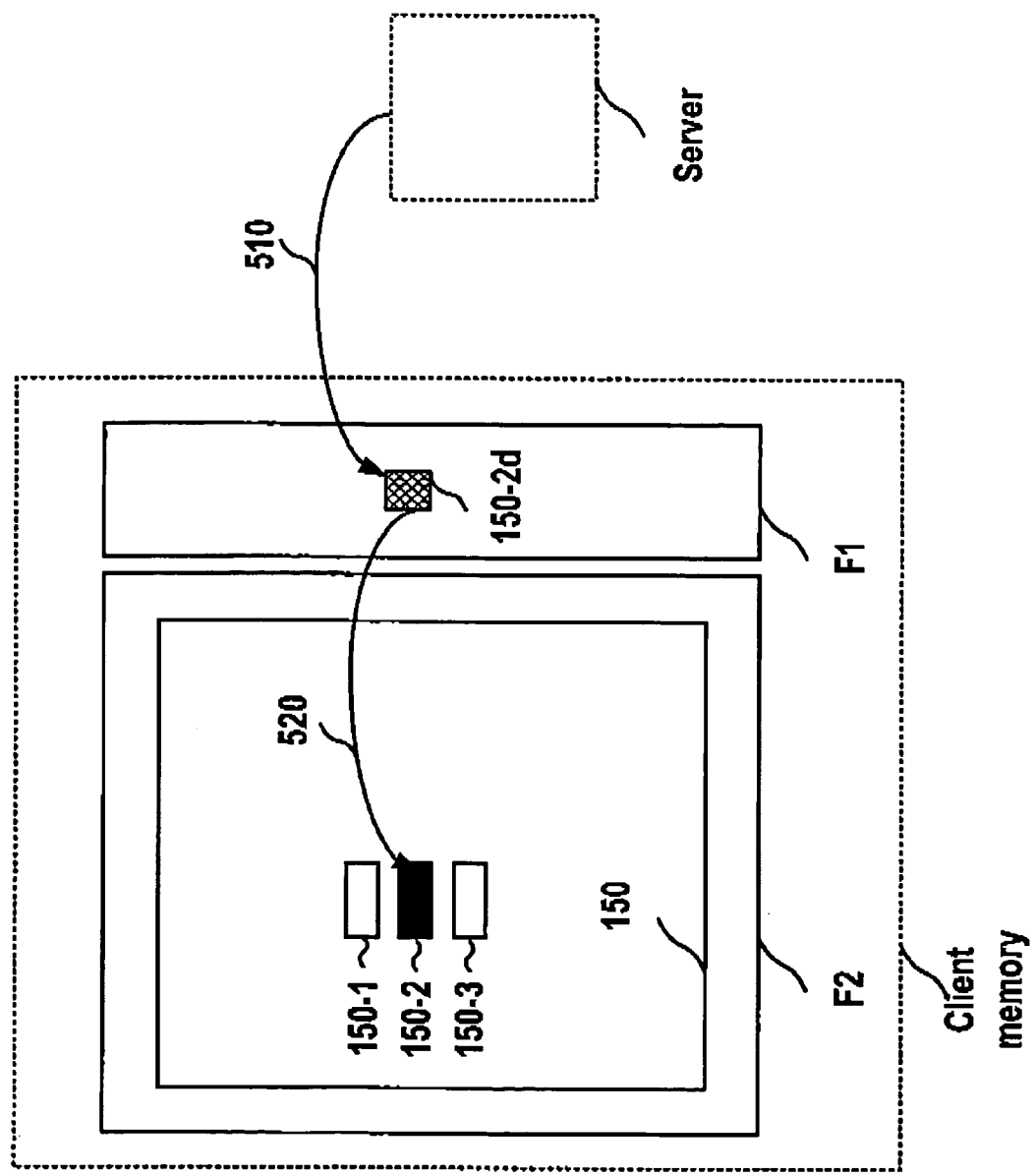
FIG. 4 illustrates updating a browser-document with the browser-delta on the client.

FIG. 4 illustrates updating browser-document 150 with browser-delta 150-2d on the client. The client memory stores first frame F1 and second frame F2. When browser-delta 150-2d is received (510) from the server, the client memory stores browser-delta 150-2d in first frame F1. Advantageously, first frame F1 is not rendered for display on an output device. For example, the width of first frame F1 can be limited to a single pixel.

The client then updates (520) browser-document 150, which is stored in second frame F2 that is rendered for display. For example, one can achieve the update (520) by replacing modified parts of browser-component 150-2 with corresponding browser-delta 150-2d (illustrated by dark fill color) in the document object model of browser-document 150. Other conventional techniques to inject browser-delta 150-2d into browser-document 150 can be used as well.

It is an effect of the present invention that the client performs updating (520) without causing screen-flicker for the user.

It is a further effect of the invention that the client switches the roles of first frame F1 and second frame F2, when a full page is received instead of a browser-delta. In other words, when the user interacts with the client in a way that a new browser-document instead of a browser-delta for the current browser-document is sent by the server, the client receives the new page in first frame F1. Then, the client recognizes the new page. Substantially simultaneously the client reduces the size of second frame F2 (so that it becomes invisible for the user) and expands the size of first frame F1 to the previous size of second frame F2. This procedure is faster than updating second frame F2 with the new page received in first frame F1, resulting in less screen flicker and waiting time for the user. Second frame F2 now has the role of a receiver frame for browser-deltas.

After having described examples of embodiments of the present invention in detail, it is now summarized as two complementary computer-implemented methods. A server computer program executed by the server implements method 400. A client computer program 100 executed by the client implements complementary method 500. Computer programs 100, 101 are stored on corresponding data carriers or carried by corresponding signals.

Figures 5A, 5B:
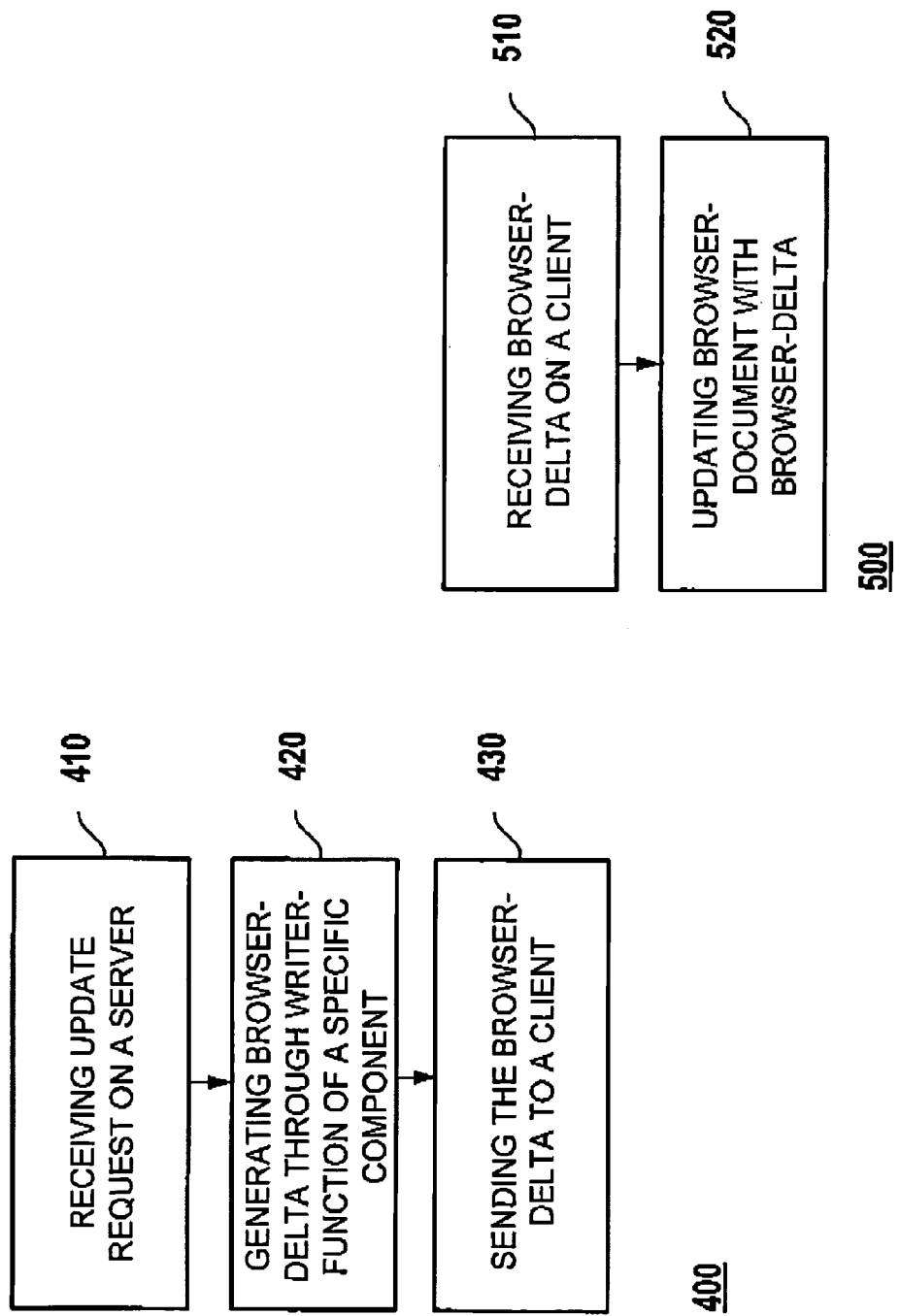
FIGS. 5A and 5B illustrate a method and complementary method for delta handling.

FIGS. 5A, 5B illustrate method 400, which can be performed by a server computer program executed by a server, and complementary method 500, which can be performed by a client computer program executed by a client, for delta-handling. Such computer programs can be stored on data carriers and carried by signals.

FIG. 5A shows method 400 for delta-handling on the server. Page-document 151 (FIG. 2) is stored on the server and includes at least one component 151-1, 151-2, 151-3 (FIG. 2). Page-document 151 is translated (210, FIG. 2) into browser-document (150, FIG. 2) that is rendered by the client for display. Method 400 includes the steps of:

Receiving (410) a request from the client resulting in an update of specific component of page-document with an application-delta. The specific component has a writer-function.

Generating (420) a browser-delta by applying the writer-function to the application-delta; and Sending (430) the browser-delta to the client for updating the browser-document on the client.

It is advantageous for the writer-function to use a delta-output-stream for the browser-delta.

Optionally, the specific component has a sub-component, which has a further writer-function. The further writer-function generates a further browser-delta on the delta-output-stream by the writer-function of the specific component.

FIG. 5B illustrates computer-implemented method 500 for delta-handling on the client. The method 500 includes the following steps:

Receiving (510) a browser-delta from the server.

Updating (520) a browser-document with the browser-delta.

In an advantageous implementation, the browser-delta is received (510) by a first frame F1 and the browser-document is updated (520) with the browser-delta in a second frame F2.

The invention can be implemented in digital electronic circuitry, or in computer hardware, firmware, software, or in combinations of them. Apparatus of the invention can be implemented in a computer program product tangibly embodied in a machine-readable storage device or a carrier signal for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will also include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer having a display device such as a CRT or LCD monitor for displaying information to the user and a keyboard and a pointing device such as a mouse or a trackball by which the user can provide input to the computer.

The invention has been described in terms of particular embodiments. Other embodiments are within the scope of the following claims. For example, steps of the invention can be performed in a different order and still achieve desirable results.

What is claimed is:

1. A method comprising:
   receiving an initial request from a client to a server for a page-document, the page-document comprising multiple page-components, each page-component being a component of the page-document and having a corresponding writer-function, the writer-functions for the multiple page-components collectively comprising multiple writer-functions, the multiple writer functions running on the server, each writer-function being a function of a class that corresponds to the corresponding page-component, each writer-function being operable to write static browser-component parts to a static output stream and updated browser-components to a distinct delta output stream;

making an initial translation for the client of the page-document to generate a browser-document, including using the writer-function corresponding to each of the multiple page-components to generate a browser-components for the browser-document, the writer-function writing the respective browser-components to the static output stream;

receiving a subsequent request from the client resulting in an update of a specific component of the page-document with an application-delta, wherein the specific component, being one of the multiple page-components, has a specific writer-function of a class that corresponds to the specific page-component;

generating a browser-delta for the specific component by applying the specific writer-function to the application-delta, the specific writer-function generating a browser-delta and writing the browser-delta to the delta output stream; and sending the browser-delta as part of the delta output stream from the server to the client for updating the browser-document on the client.

2. The method of claim 1, wherein the page-document is a page selected from the group of JavaServer Pages page, Business Server Pages, Active Server Pages page.

3. The method of claim 2, wherein the specific component is a tag within the page-document.

4. The method of claim 3, wherein the writer-function is a function of a class that is written in an object-oriented programming language.

5. The method of claim 1, wherein the browser-document is a markup language document.

6. The method of claim 1, wherein the writer function generates the browser delta in a markup language.

7. The method of claim 1, wherein the specific component has a sub-component having a further writer-function that generates a further browser-delta on the delta-output-stream through the writer-function of the specific component.

8. A computer program product for delta-handling on a server, wherein the server stores a page-document that comprises at least one component and the page-document is translated into a browser-document that is displayed by a client, the computer program product being tangibly embodied in a machine-readable storage device and having instructions for causing at least one processor to:

receive an initial request from a client to a server for a page-document, the page-document comprising multiple page-components, each page-component being a component of the page-document and having a corresponding writer-function, the writer-functions for the multiple page-components collectively comprising multiple writer-functions, the multiple writer functions running on the server, each writer-function being a function of a class that corresponds to the corresponding page-component, each writer-function being operable to write static browser-component parts to a static output stream and updated browser-components to a distinct delta output stream;

make an initial translation for the client of the page-document to generate a browser-document, including using the writer-function corresponding to each of the multiple page-components to generate a browser-component for the browser-document, the writer-function writing the respective browser-components to the static output stream;

receive a subsequent request from the client resulting in an update of a specific component of the page-document with an application-delta, wherein the specific component, being one of the multiple page-components, has a specific writer-function of a class that corresponds to the specific page-component;

generate a browser-delta for the specific component by applying the specific writer-function to the application-delta, the specific writer-function generating a browser-delta and writing the browser-delta to the delta output stream; and send the browser-delta as part of the delta output stream from the server to the client for updating the browser-document on the client.

9. The computer program product of claim 8, wherein the writer-function is a function of a class that is written in an object-oriented programming language.

10. The computer program product of claim 8, wherein the specific component has a sub-component having a further writer-function that generates a further browser-delta on the delta-output-stream through the writer-function of the specific component.

11. A computer system for delta-handling comprising:

a server comprising a computer, wherein the server stores a page-document that comprises multiple page-components, each page-component being a component of the page-document and having a corresponding writer-function, the writer-functions for the multiple page-components collectively comprising multiple writer-function, the multiple writer functions running on the server, each writer-function being a function of a class that corresponds to the corresponding page-component, each writer-function being operable to write static browser-component parts to a static output stream and updated browser-components to a distinct delta output stream, and the page-document is initially translated into a browser-document that is displayed by a client, the writer-function corresponding to each of the multiple page-components being used in the translation to generate a browser-component for the browser-document, the writer-function writing the respective browser-components to the static output stream; the server receiving a request from the client resulting in an update of a specific component of the page-document with an application-delta, wherein the specific component, being one of the multiple page-components has a specific writer-function, the server generating a browser-delta for the specific component by applying the specific writer-function to the application-delta, the specific writer-function generating a browser-delta and writing the browser-delta to the delta output stream, the server sending the browser-delta as part of the delta output stream to the client; and the client receiving the browser-delta from the server and updating the browser-document with the browser-delta.

12. The computer system of claim 11, wherein the client receives the browser-delta in a first frame and the browser-document is updated with the browser-delta in a second frame.

13. The computer system of claim 11, wherein the specific writer function is a function of a class that is written in an object oriented programming language.

14. A server for delta-handling comprising:

a network connection for receiving a request from a client;

a memory storing a page-document that comprises multiple page-components and is displayed by a client; each page-component being a component of the page-document and having a corresponding writer-function, the writer-functions for the multiple page-components collectively comprising multiple writer-functions, each writer-function being a function of a class that corresponds to the corresponding page-component, each writer-function being operable to write static browser-component parts to a static output stream and updated browser-components to a distinct delta output stream; and a processor translating the page-document into a browser-document stored in the memory, the processor processing the request resulting in an update of a specific page-component of the page-document with an application-delta, wherein the specific page-component has a writer-function, the writer-function having two output streams, a static output stream and a delta output stream, the processor generating a browser-delta in the memory by applying the writer-function to the application-delta and sending the browser-delta as part of the delta output stream to the client for updating the browser-document on the client.

15. The server of claim 14, wherein the writer-function is a function of a class that is written in an object-oriented programming language.

* * * * *